United States Patent
Wu et al.

(10) Patent No.: US 7,432,026 B2
(45) Date of Patent: Oct. 7, 2008

(54) METHOD OF MANUFACTURING DICHROIC FILTER ARRAY

(75) Inventors: Yi-Tyng Wu, Chiayi (TW); Fu-Kuo Ou, Hsinchu (TW)

(73) Assignees: United Microelectronics Corp., Hsinchu (TW); United Microdisplay Optronics Corp., Hsin-Chu (TW)

( * ) Notice: Subject to any disclaimer, the term of this patent is extended or adjusted under 35 U.S.C. 154(b) by 133 days.

(21) Appl. No.: 11/308,810

(22) Filed: May 10, 2006

(65) Prior Publication Data

US 2007/0264586 A1    Nov. 15, 2007

(51) Int. Cl.
G02B 5/20 (2006.01)

(52) U.S. Cl. .................... 430/7; 430/323; 430/324; 216/24

(58) Field of Classification Search .................... None
See application file for complete search history.

(56) References Cited

U.S. PATENT DOCUMENTS 5,711,889 A    1/1998    Buchsbaum ............. 216/5
6,342,970 B1 *  1/2002    Sperger et al. .......... 359/587

FOREIGN PATENT DOCUMENTS

CN    1685487    10/2005
JP    1-129203 A  *  5/1989

* cited by examiner

Primary Examiner—John A. McPherson
(74) Attorney, Agent, or Firm—Jianq Chyun IP Office

(57) ABSTRACT

A method of manufacturing a dichroic filter array is provided and comprises forming a first dichroic filter material layer on a substrate, and then forming a patterned photoresist layer on the first dichroic filter material layer. The exposed portion of the first dichroic filter material layer is removed so as to form a plurality of first dichroic filter units. A second dichroic filter material layer is formed on the substrate and the patterned photoresist layer. The patterned photoresist layer and the second dichroic filter material layer located on the patterned photoresist layer are removed, and the second dichroic filter material layer between the first dichroic filter units are transformed into a plurality of second dichroic filter units. By using etching process and the lift-off process to simultaneously remove redundant dichroic filter material and the photoreisit layer, the multi-chroic filter array device with a relatively small volume can be rapidly produced.

21 Claims, 5 Drawing Sheets

METHOD OF MANUFACTURING DICHROIC FILTER ARRAY

BACKGROUND OF THE INVENTION

1. Field of Invention

The present invention relates to a method of manufacturing a filter film layer. More particularly, the present invention relates to a method of manufacturing a dichroic filter array.

2. Description of Related Art

Recently, various displays comprising Liquid Crystal Display (LCD), Field Emission Display (FED), Organic Light Emitting Diode (OLED), and Plasma Display Panel (PDP) have come to be widely used in daily life, such as those applied in TVs, computers, projectors, mobile phones, and personal audio-visual fittings.

The difference among different types of displays lies in the imaging manner. One of them utilizes a light source, several optical elements composed of prism groups, and multiple panels corresponding to each beam. The principle thereof is that the light source (white light) is filtered into three primary color beams, R, G, B, with the prism groups, and then modulated with three panels to make the image signals carried in the three beams. Finally, the images can be synthesized by optical elements, such as, dichroic prisms and lenses. However, the three panels comprise a micro-display.

The micro-display can be applied in various kinds of displays, such as, LCD or OLED. However, the micro-display can be constructed on different substrates, resulting in different manners of imaging. For example, micro-displays applied in LCDs are called micro-LCD panels, and can be divided into transmissive LCD micro-display panels and reflective LCD micro-display panels. A transmissive LCD micro-display panel is usually constructed on a glass substrate, and a reflective LCD micro-display panel is usually constructed on a silicon substrate, also called a Liquid Crystal on Silicon display panel (LCOS display panel). A LCOS display panel using a silicon wafer as a substrate adopts the MOS transistor replacing the thin film transistor (TFT) of the conventional LCD, and the pixel electrodes thereof are mainly made of metal materials.

Recently, however, in order to further reduce the cost and volume of the display, the industry is trying to achieve the object of reducing the number of panels from three to two or even one. When one or two panels are used, it is necessary to combine the three primary beams to one or two beams, i.e. the beam reaching the panels contains two to three primary colors. Therefore, it is necessary to add a filter film layer on the panel (i.e. micro-display) to separate the beam containing two to three primary colors. That is, the multi-chroic filter array is formed on the panel to separate primary colors in the received beam. However, the manufacturing process for forming the multi-chroic filter array is complicated and difficult so that the manufacturing cost is high and the manufacturing process is time consuming.

SUMMARY OF THE INVENTION

An object of the present invention is to provide a method of manufacturing a dichroic filter array, so as to dispose an array of alternately arranged dichroic filter units having two primary colors on a micro-display.

Another object of the present invention is to provide a method of manufacturing a dichroic filter array, so as to dispose an array of alternately arranged dichroic filter units having three different primary colors on a micro-display.

The present provides a method of manufacturing a dichroic filter array, applied in a micro-display. The method comprises the steps of forming a first dichroic filter material layer on a substrate, and then forming a patterned photoresist layer on the first dichroic filter material layer. The exposed portion of the first dichroic filter material layer is removed so as to form a plurality of first dichroic filter units. A second dichroic filter material layer is formed on the substrate and the patterned photoresist layer. The patterned photoresist layer and the second dichroic filter material layer located on the patterned photoresist layer are removed, and the second dichroic filter material layer between the first dichroic filter units are transformed into a plurality of second dichroic filter units. The first dichroic filter units and the second dichroic filter units constitute a dichroic filter array.

As described in an embodiment of the present invention, after the step of forming a first dichroic filter material layer, forming a hardmask layer on the first dichroic filter material layer is further included. Then, after the step of removing the patterned photoresist layer, removing the hardmask layer on the first dichroic filter material layer is further included. The material of the hardmask layer includes silicon nitride, silicon oxide, or silicon oxynitride.

According to an embodiment of the present invention, the substrate is selected from a group consisting of a transparent substrate and a silicon substrate. The silicon substrate contains a controlling element for controlling the dichroic filter array.

According to an embodiment of the present invention, the method of removing the patterned photoresist layer and the second dichroic filter material layer located on the patterned photoresist layer includes a lift-off process.

According to an embodiment of the present invention, the method of removing the exposed portion of the first dichroic filter material layer includes a dry etching process with the patterned photoresist layer as a mask.

According to an embodiment of the present invention, the material layers of the first dichroic filter material layer and the second dichroic filter material layer include a lamination of titanium oxide thin layers and silicon oxide thin layers alternately stacked. The manufacturing method thereof includes evaporation, sputtering, or Chemical Vapor Deposition (CVD).

According to an embodiment of the present invention, the filtered wave bands of the first dichroic filter units and the second dichroic filter units are different.

A method of manufacturing a dichroic filter array is provided by the present invention and comprises steps of forming a first dichroic filter material layer on a substrate, and then forming a first patterned photoresist layer on the first dichroic filter material layer. The exposed portion of the first dichroic filter material layer is removed so as to form a plurality of first dichroic filter units. A second dichroic filter material layer is formed on the substrate and the patterned photoresist layer. The first patterned photoresist layer and the second dichroic filter material layer located on the first patterned photoresist layer are removed and the second dichroic filter material layer between the first dichroic filter units are transformed into a plurality of second dichroic filter units. The first dichroic filter units and the second dichroic filter units constitute the dichroic filter array. Then, forming a second patterned photoresist layer on the first dichroic filter array. The exposed portion of the first dichroic filter array is removed so as to form a second dichroic filter array and expose a portion of the substrate. A third dichroic filter material layer is formed on the substrate and the second patterned photoresist layer. The second patterned photoresist layer and the third dichroic filter material layer located on the second patterned photoresist layer are removed and the third dichroic filter material layer between the second dichroic filter array are transformed into a plurality of third dichroic filter units. The second dichroic filter array and the third dichroic filter units constitute a third dichroic filter array.

According to an embodiment of the present invention, after the step of forming a first dichroic filter material layer, forming a first hardmask layer on the first dichroic filter material layer is further included. Then, after the step of removing the first patterned photoresist layer, removing the first hardmask layer on the first dichroic filter material layer is further included. The material of the first hardmask layer includes silicon nitride, silicon oxide, or silicon oxynitride.

According to an embodiment of the present invention, after the step of forming a first dichroic filter array, forming a second hardmask layer on the first dichroic filter array is further included. Then, after the step of removing the second patterned photoresist layer, removing the second hardmask layer on the second dichroic filter array is further included. The material of the second hardmask layer includes silicon nitride, silicon oxide, or silicon oxynitride.

According to an embodiment of the present invention, the substrate is selected from a group consisting of a transparent substrate and a silicon substrate. The silicon substrate contains a controlling element for controlling the dichroic filter array.

According to an embodiment of the present invention, the method of removing the first patterned photoresist layer and the second dichroic filter material layer located on the first patterned photoresist layer includes a lift-off process.

According to an embodiment of the present invention, the method of removing the second patterned photoresist layer and the third dichroic filter material layer located on the second patterned photoresist layer includes a lift-off process.

According to an embodiment of the present invention, the method of removing the exposed portion of the first dichroic filter material layer includes a dry etching process with the first patterned photoresist layer as a mask.

According to an embodiment of the present invention, the method of removing the exposed portion of the first dichroic filter array includes a dry etching process with the second patterned photoresist layer as a mask.

According to an embodiment of the present invention, the first dichroic filter material layer, the second dichroic filter material layer, and the third dichroic filter material layer include a lamination of titanium oxide thin layers and silicon oxide thin layers alternately stacked. The manufacturing method thereof includes evaporation, sputtering, or CVD.

According to an embodiment of the present invention, the filtered wave bands of the first dichroic filter units, the second dichroic filter units, and the third dichroic filter units are different.

In the present invention, the dichroic filter array is added to the micro-display. The dichroic filter array has dichroic filter units with more than two different filtered wave bands, and thereby the display only employs two micro-displays or even one micro-display, thus reducing the cost and the volume. Also, the manufacturing process is simplified and the multichroic filter array device with a relatively small volume can be rapidly produced. Each dichroic filter unit in the dichroic filter array has uniform thickness and flat surface, thus enhancing the yield of the micro-display. Moreover, the thickness of the dichroic filter array can be designed as desired to achieve the optimum electrical consumption and optimum filtering performance of the display.

In order to the make aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In order to reduce the cost and volume of the display, in the present invention the number of micro-displays is reduced, i.e., to combine primary color beams incident to a microdisplay. When a micro-display receives more than two primary colors, it is necessary to add dichroic filter arrays with different filtered wave bands, so as to divide the micro-display into several units. Adjacent units receive different primary color beams, and then a digital process is carried out for imaging.

FIGS. 1A to 1D are sectional structural views of a method of manufacturing a dichroic filter array according to an embodiment of the present invention. The dichroic filter array, for example, is applied in the micro-display.

Figure 1A:
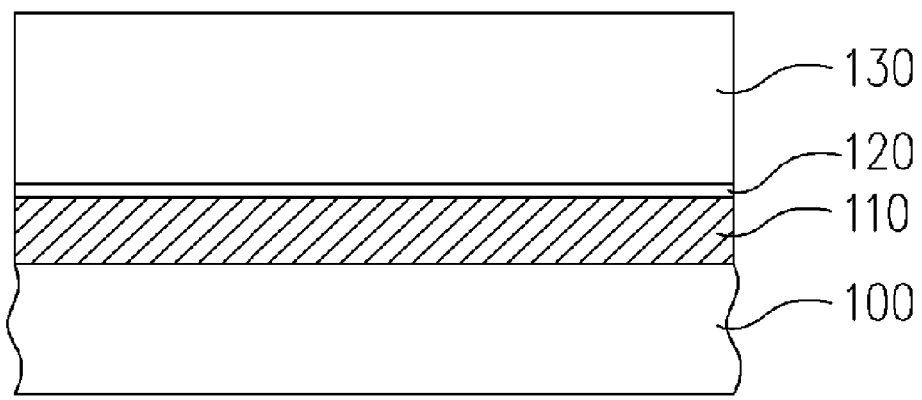
FIGS. 1A to 1D are sectional structural views of a method of manufacturing a dichroic filter array according to an embodiment of the present invention.

First, with reference to FIG. 1A, a dichroic filter material layer 110 is formed on a substrate 100, and then a photoresist layer 130 is formed on the first dichroic filter material layer 110. The substrate 100 cab be, for example, selected from a group consisting of a transparent substrate and a silicon substrate, depending on the types of displays using the processed elements. Usually, the desired material layers or integrated circuitries (IC) have already been formed in the substrate. For example, the silicon substrate has a controlling element for controlling the dichroic filter arrays formed subsequently. For example, LCOS employs the silicon substrate. The silicon substrate has an IC of complementary transistor, and material layers such as a reflective unit array and an LC layer are disposed in sequence on the silicon substrate.

Moreover, the first dichroic filter material layer 110, for example, is a lamination of multiple layers of thin films made of different materials stacked alternately. The material thereof can be metal films, dielectric material layer, and the like, so the manufacturing method can be evaporation, sputtering, or CVD. In a preferred embodiment, the dichroic filter material layer is, for example, a lamination of titanium oxide thin layers and silicon oxide thin layers alternately stacked. It should be noted that if the first dichroic filter material layer 110 is too thick, it is necessary to enhance the light source, thus increasing the electrical consumption. On the other hand, if the dichroic filter is too thin, the filtering performance will be affected. Therefore, it is easy to control the thickness of the dichroic filter material layer 110 by forming the first dichroic filter material layer 110 with a multilayer structure. Hence, the electrical consumption of the display can be well controlled and the filtering performance can be achieved as well.

In one embodiment, before forming the photoresist layer 130, a hardmask layer 120 can be formed on the first dichroic filter material layer 110. The material of the hardmask layer 120 is, for example, silicon nitride, silicon oxide, or silicon oxynitride. Since a hardmask layer 120 is formed on the first dichroic filter material layer 110, when the photoresist layer 130 on the first dichroic filter material layer 110 is removed subsequently, the surface of the first dichroic filter material layer 110 are protected from being directly damaged by the solvate used in removing.

Figure 1B:
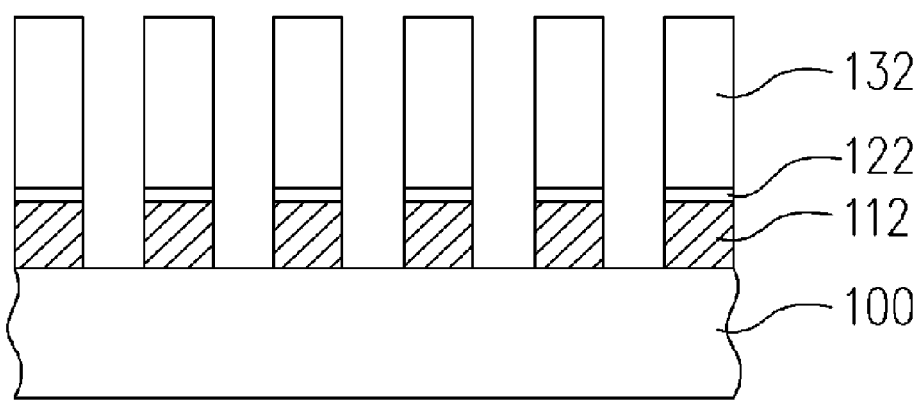

Then, with reference to FIG. 1B, the photoresist layer 130 is patterned to form a patterned photoresist layer 132, and expose the first dichroic filter material layer 110 at the dichroic filter film layer for forming another filtered wave band. Then, the exposed portion of the first dichroic filter material layer 110 and the hardmask layer 120 thereon are removed, in order to form several first dichroic filter units 112 and a hardmask layer 122. The method of removing the exposed portion of the first dichroic filter material layer 110 and the hardmask layer 120 thereon is, for example, a dry etching process with the patterned photoresist layer 132 as a mask.

Figure 1C:
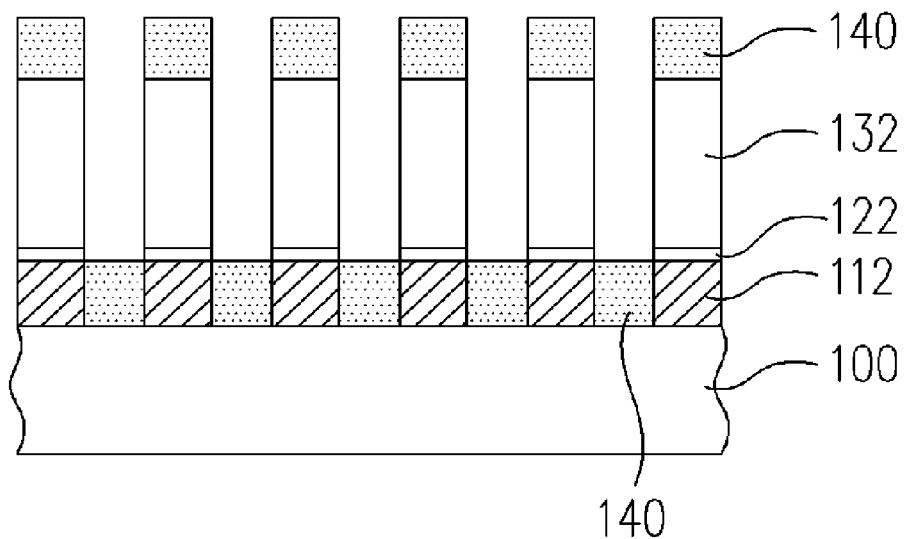

Then, with reference to FIG. 1C, a second dichroic filter material layer 140 is formed on the substrate 100 and the patterned photoresist layer 132. The second dichroic filter material layer 140 is, for example, a lamination of different materials, for example, metal films, dielectric material layers, and the like, stacked alternately. Therefore, the manufacturing method can be evaporation, sputtering, or CVD. In a preferred embodiment, the dichroic filter material layer is, for example, a lamination of titanium oxide thin layers and silicon oxide thin layers alternately stacked. The filtered wave bands of the second dichroic filter material layer 140 and the first dichroic filter material layer 110 are different. However, the second dichroic filter material layer 140 is also formed in the manner of stacking multiple layers of thin films, thereby controlling the electrical consumption and filtering performance of the display.

Figure 1D:
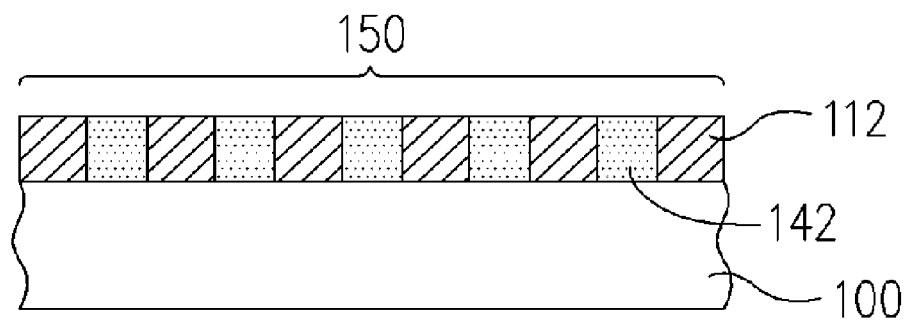

Then, with reference to FIG. 1D, the patterned photoresist layer 132 and the second dichroic filter material layer 140 located on the patterned photoresist layer 132 are removed, and the second dichroic filter material layer 140 between the dichroic filter units 112 are transformed into a plurality of second dichroic filter units 142. And the method of removing the patterned photoresist layer 132 and the second dichroic filter material layer 140 located on the patterned photoresist layer 132 is lift-off process. Then, the hardmask layer 122 on the first dichroic filter unit 112 is removed. The first dichroic filter units 112 and the second dichroic filter units 142 constitute the dichroic filter array 150.

The lift-off described above utilizes a selective organic solution, such as AZ developer or acetone, so as to carry out a chemical reaction with the patterned photoresist layer 132. Since chemical reactions between photoresist material layers and organic solutions occur, thus generating a gel-like material, the step can be used to lift off the patterned photoresist layer 132 together with the second dichroic filter material layer 140 located thereon. Particularly, since the selective organic solution are used and the first dichroic filter unit 112 is protected by the hardmask layer 122, the dichroic filter array 150 is protected from being damaged or removed which may cause the phenomenon of the non-uniform thickness or uneven surface.

The patterned photoresist layer 132 and the second dichroic filter material layer 140 over the patterned photoresist layer 132 are removed by the lift-off process at the same time, so that the manufacturing process can be simplified and the dichroic filter array 150 with a relatively small volume can be rapidly produced. Further, the dichroic filter array 150 is stacked by multiple layers of films made of different materials, and the patterned photoresist layer 132 thereon is removed by lifting off. Therefore, the first dichroic filter units 112 and the second dichroic filter unit 142 has the same thickness and flat surface. Hence, the yield of the micro-display is increased. Moreover, the thickness can be designed in accordance with the consideration of the electrical consumption and the filtering performance.

Moreover, the filtered wave bands of the first dichroic filter units 112 and the second dichroic filter units 142 are different from each other. On the other words, the wavelengths of the lights can pass through the first dichroic filter units 112 and the second dichroic filter units 142 are different from each other. Therefore, the dichroic filter array 150 allows each unit in the corresponding substrate 100 to receive lights of different wavelengths and then to digitalize the received lights. Hence, the micro-display formed by the method according to the present invention can process at least two primary color beams at the same time so that manufacturing cost is decreased and the volume of the micro-display is reduced as well.

FIGS. 2A to 2H are sectional structural views of a method of manufacturing a dichroic filter array according to another embodiment of the present invention. The dichroic filter array is, for example, applicable to the micro-display.

Figure 2A:
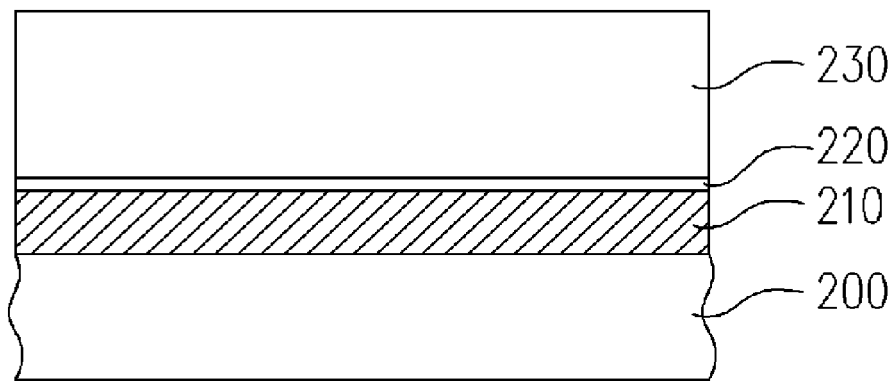
FIGS. 2A to 2H are sectional structural views of a method of manufacturing a dichroic filter array according to another embodiment of the present invention.

First, with reference to FIG. 2A, a first dichroic filter material layer 210 is formed on a substrate 100, and then a photoresist layer 230 is formed on the first dichroic filter material layer 210. The substrate 200 can be, for example, selected from a group consisting of a transparent substrate and a silicon substrate, depending on the types of displays applied with the processed elements. Usually, the desired material layers or ICs has already been formed in the substrate, for example, the silicon substrate has a controlling element for controlling the dichroic filter arrays. For example, LCOS employs the silicon substrate. The silicon substrate has an IC of complementary transistor and material layers such as a reflective unit array and an LC layer are disposed in sequence on the silicon substrate.

Moreover, the material of the first dichroic filter material layer 210, the method for forming the first dichroic filter material layer 210 and the feature of the first chroic filter material layer 210 are described in the previous embodiment and are not depicted herein.

In one embodiment, before forming the photoresist layer 230, a hardmask layer 220 can be formed on the first dichroic filter material layer 210. The material of the hardmask layer 220 is, for example, silicon nitride, silicon oxide, or silicon oxynitride. Since a hardmask layer 220 is formed on the first dichroic filter material layer 210, when the photoresist layer 230 on the first dichroic filter material layer 210 is removed subsequently, the surface of the first dichroic filter material layer 210 is protected from being directly damaged by the solvate used in removing.

Figure 2B:
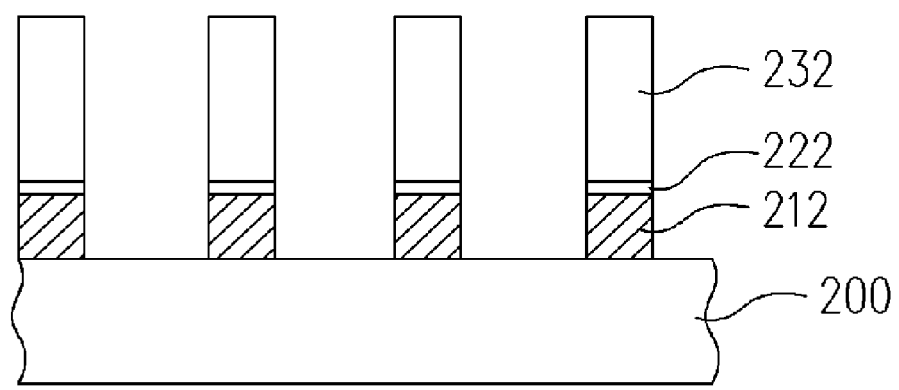

Then, with reference to FIG. 2B, the photoresist layer 230 is patterned to form a patterned photoresist layer 232, and expose the first dichroic filter material layer 210 at the dichroic filter film layer for forming another filtered wave band. Then, the exposed portion of the first dichroic filter material layer 210 and the hardmask layer 220 thereon are removed, in order to form several first dichroic filter units 212 and a hardmask layer 222. The method of removing the exposed portion of the first dichroic filter material layer 210 and the hardmask layer 220 is, for example, a dry etching process with the first patterned photoresist layer 232 as a mask.

Figure 2C:
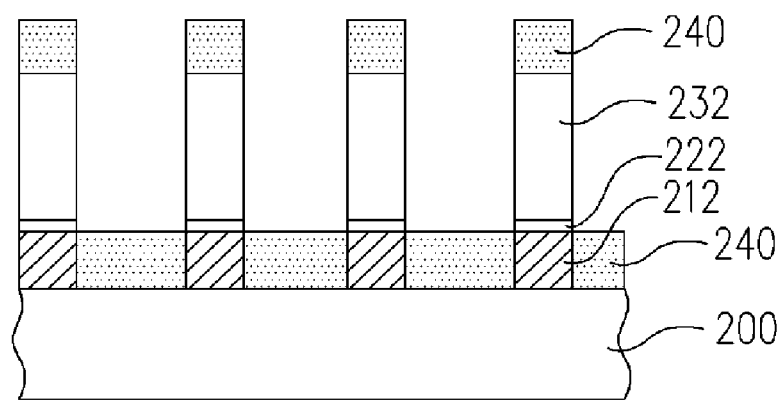

Then, with reference to FIG. 2C, a second dichroic filter material layer 240 is formed on the substrate 200 and the patterned photoresist layer 232. The second dichroic filter material layer 240 is, for example, a lamination of different materials such as metal films and dielectric material layers stacked alternately. So the manufacturing method can be evaporation, sputtering, or CVD. In a preferred embodiment, the dichroic filter material layer is, for example, a lamination of titanium oxide thin layers and silicon oxide thin layers alternately stacked. The filtered wave bands of the second dichroic filter material layer 240 and the first dichroic filter material layer 210 are different. However, the second dichroic filter material layer 240 is also formed in the manner of stacking multiple layers of thin films, so as to control the electrical consumption and filtering performance of the display.

Figure 2D:
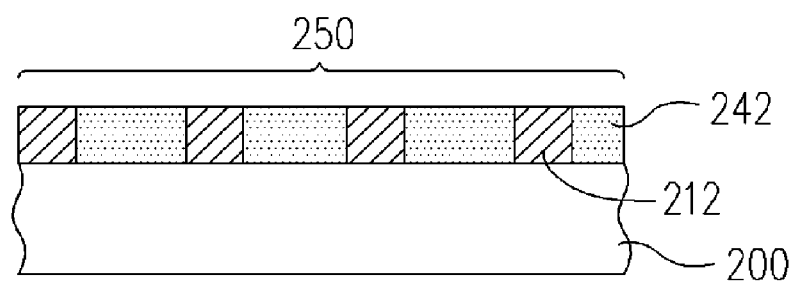

Then, with reference to FIG. 2D, the patterned photoresist layer 232 and the second dichroic filter material layer 240 located on the patterned photoresist layer 232 are removed, and the second dichroic filter material layer 240 between the first dichroic filter units 212 are transformed into a plurality of second dichroic filter units 242. And the method of removing the patterned photoresist layer 232 and the second dichroic filter material layer 240 located on the patterned photoresist layer 232 is the lift-off. Then, the hardmask layer 222 on the first dichroic filter units 212 is removed. The first dichroic filter units 212 and the second dichroic filter units 242 constitute the first dichroic filter array 250.

The lift-off process described above utilizes selective organic solutions, such as AZ developer or acetone to carry out chemical reactions with the patterned photoresist layer 232. Since chemical reactions between photoresist material layers and organic solutions occur, thus generating gel-like material layers. Therefore, the step can be used to lift off the patterned photoresist layer 232 together with the second dichroic filter material layer 240 thereon. Particularly, since the selective organic solutions are used and the first dichroic filter unit 212 is protected by the hardmask layer 222, the first dichroic filter array 250 is protected form being damaged or removed which may cause the phenomenon of non-uniform thickness or uneven surface.

Figure 2E:
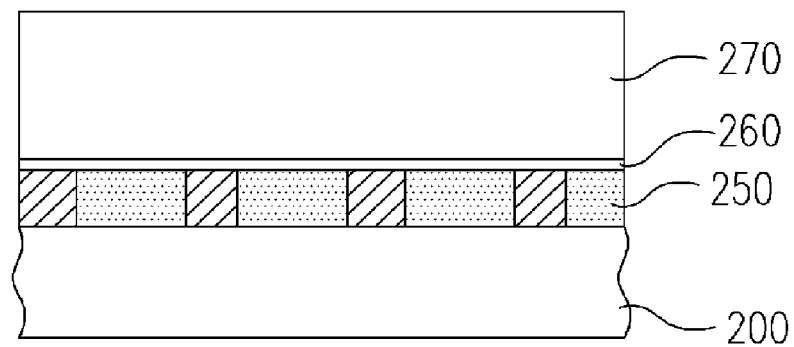

Then, with reference to FIG. 2E, a photoresist layer 270 is formed on the dichroic filter array 250. In one embodiment, before forming the photoresist layer 270, a hardmask layer 260 can be formed on the first dichroic filter array 250, such that when the photoresist layer 270 on the first dichroic filter array 250 is removed susequently, the first dichroic filter array 250 is protected from being damaged by the solvate used in removing. The material of the hardmask layer 260 is, for example, silicon nitride, silicon oxide, or silicon oxynitride.

Figure 2F:
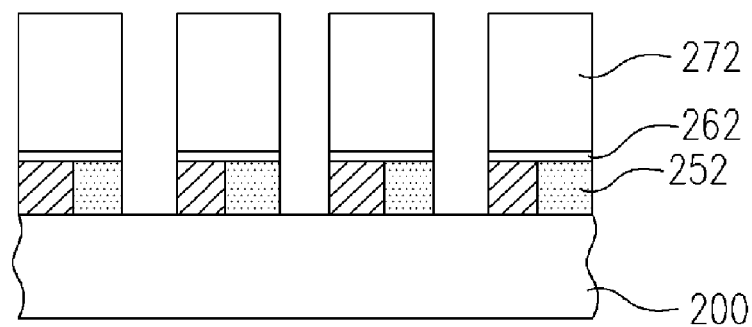

Then, with reference to FIG. 2F, the photoresist layer 270 is patterned to form a patterned photoresist layer 272, and expose the first dichroic filter array 250 at the dichroic filter film layer for forming the third filtered wave band. Then, the exposed portion of the first dichroic filter array 250 and the hardmask layer 262 thereon are removed, in order to form a second dichroic filter units 252 and a hardmask layer 262 and expose a portion of the substrate 200. The method of removing the exposed portion of the first dichroic filter array 250 and the hardmask layer 262 is, for example, a dry etching process with the patterned photoresist layer 272 as a mask.

Figure 2G:
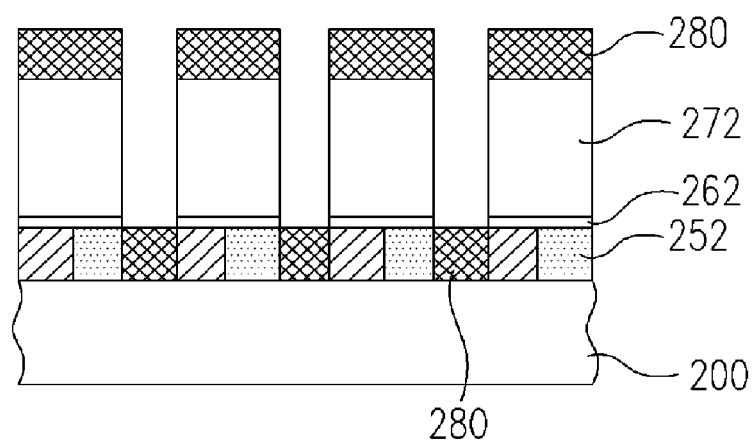

Then, with reference to FIG. 2G, a third dichroic filter material layer 280 is formed on the substrate 200 and the patterned photoresist layer 272. The third dichroic filter material layer 280 is, for example, a lamination of different material layers such as metal films and dielectric material layers stacked alternately. So the manufacturing method can be evaporation, sputtering, or CVD. In a preferred embodiment, the dichroic filter material layer is, for example, a lamination of titanium oxide thin layers and silicon oxide thin layers alternately stacked. The filtered wave bands of the third dichroic filter material layer 280 and the second dichroic filter material layer 240 and the first dichroic filter material layer 210 are different. However, the third dichroic filter material layer 280 is also formed in the manner of stacking multiple layers of thin films, so as to control the electrical consumption and filtering performance of the display.

Figure 2H:
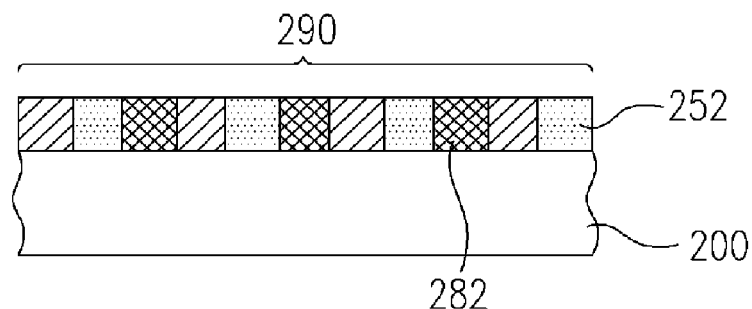

Then, with reference to FIG. 2H, the patterned photoresist layer 272 and the third dichroic filter material layer 280 located on the patterned photoresist layer 272 are removed, and the third dichroic filter material layer 280 between the second dichroic filter arrays 252 are transformed into a plurality of third dichroic filter units 282. And the method of removing the patterned photoresist layer 272 and the third dichroic filter material layer 280 located on the patterned photoresist layer 272 is, for example, the lift-off. Then, the hardmask layer 262 on the second dichroic filter array 252 is removed. The second dichroic filter array 252 and the third dichroic filter unit 282 constitute a third dichroic filter array 290.

The principle, method, and materials of the lift off method are the same as that in FIG. 2D, thus avoiding the phenomenon of the non-uniform thickness or uneven surface of the third dichroic filter array 290. More specially, in FIG. 2D and FIG. 2H, the lift-off process is used to remove the patterned photoresist layer and the dichroic filter material layer at the same time so that the manufacturing process is simplified by comparing with the conventional manufacturing process and the third dichroic filter array 290 with relatively small volume can be formed rapidly.

It should be noted that the filtered wave bands of the first dichroic filter units 210, the second dichroic filter unit 240 and the third dichroic filter unit 280 are different, i.e. the wavelengths they can transmit are different. Therefore, the third dichroic filter array 290 allows each unit in the corresponding substrate 200 receives lights of different wavelengths, and then the digital process is carried out. As such, one micro-display can process beams of three primary colors, and the whole display only employs one micro-display, thus reducing the cost and the volume of the display. Further, the third dichroic filter array 290 is stacked by multiple layers of films made of different materials, and the patterned photoresist layer 272 located thereon is removed by the lift-off. So each of the first dichroic filter unit 212, the second dichroic filter unit 242 and the third dichroic filter unit 282 has the same thickness and flat surface, thus enhancing the yield of the micro-display. Moreover, the thickness of the dichroic filter array can be designed in accordance with the consideration of the electrical consumption and the filtering performance.

To sum up, the present invention has the following advantages.

1. By using the lift-off process to remove the patterned photoresist layer and the dichroic filter material layer over the patterned photoresist layer, the manufacturing process for forming the dichroic filter array can be simplified and the multi-chroic filter array device with a relatively small volume can be massively and rapidly produced.

2. The dichroic filter array is added to the micro-display. The dichroic filter array has dichroic filter units having more than two different filtered wave bands, thus the display only employs two micro-displays or even one micro-display, thus reducing the cost and the volume.

3. Each dichroic filter unit in the dichroic filter array has uniform thickness and flat surface, thus enhancing the yield of the micro-display. Moreover, the thickness of the dichroic filter array can be designed in accordance with considerations of electrical consumption and filtering performance.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of manufacturing a dichroic filter array, comprising:
    forming a first dichroic filter material layer on a substrate;
    forming a hardmask layer and a patterned photoresist layer on the first dichroic filter material layer;
    removing a portion of the first dichroic filter material layer exposed by the patterned photoresist layer so as to form a plurality of first dichroic filter units;
    forming a second dichroic filter material layer on the substrate and the patterned photoresist layer;
    removing the patterned photoresist layer and a portion of the second dichroic filter material layer located on the patterned photoresist layer, and transforming the rest portion of the second dichroic filter material layer between the first dichroic filter units into a plurality of second dichroic filter units, wherein the first dichroic filter units and the second dichroic filter units together form a dichroic filter array; and
    removing the hardmask layer on the first dichroic filter units after the patterned photoresist layer is removed.

2. The method of manufacturing a dichroic filter array as claimed in claim 1, wherein the material of the hardmask layer includes silicon nitride, silicon oxide, or silicon oxynitride.

3. The method of manufacturing a dichroic filter array as claimed in claim 1, wherein the substrate is selected from a group consisting of a transparent substrate and a silicon substrate.

4. The method of manufacturing a dichroic filter array as claimed in claim 3, wherein the silicon substrate comprises a controlling element, for controlling the dichroic filter array.

5. The method of manufacturing a dichroic filter array as claimed in claim 1, wherein the method of removing the patterned photoresist layer and the second dichroic filter material layer located on the patterned photoresist layer includes a lift-off process.

6. The method of manufacturing a dichroic filter array as claimed in claim 1, wherein the method of removing the exposed portion of the first dichroic filter material layer includes a dry etching process with the patterned photoresist layer as a mask.

7. The method of manufacturing a dichroic filter array as claimed in claim 1, wherein the material of the first dichroic filter material layer and the second dichroic filter material layer includes an alternately stacked titanium oxide thin layers and silicon oxide thin layers.

8. The method of manufacturing a dichroic filter array as claimed in claim 1, wherein the method of manufacturing the first dichroic filter material layer and the second dichroic filter material layer includes evaporation, sputtering, or Chemical Vapor Deposition (CVD).

9. The method of manufacturing a dichroic filter array as claimed in claim 1, wherein the filtered wave bands of the first dichroic filter unit and the second dichroic filter unit are different.

10. A method of manufacturing a dichroic filter array, comprising:
    forming a first dichroic filter material layer on a substrate;
    forming a first hardmask layer and a first patterned photoresist layer on the first dichroic filter material layer;
    removing a portion of the first dichroic filter material layer exposed by the first patterned photoresist layer so as to form a plurality of first dichroic filter units;
    forming a second dichroic filter material layer on the substrate and the patterned photoresist layer;
    removing the first patterned photoresist layer and a portion of the second dichroic filter material layer located on the first patterned photoresist layer, and transforming the rest portion of the second dichroic filter material layer between the first dichroic filter units into a plurality of second dichroic filter units, wherein the first dichroic filter units and the second dichroic filter units together form a first dichroic filter array;
    removing the first hardmask layer on the first dichroic filter units after the first patterned photoresist layer is removed;
    forming a second hardmask layer and a second patterned photoresist layer on the first dichroic filter array;
    removing a portion of the first dichroic filter array exposed by the second patterned photoresist layer so as to form a second dichroic filter array and expose a portion of the substrate;
    forming a third dichroic filter material layer on the substrate and the second patterned photoresist layer;
    removing the second patterned photoresist layer and a portion of the third dichroic filter material layer located on the second patterned photoresist layer, and transforming the rest portion of the third dichroic filter material layer between the second dichroic filter arrays into a plurality of third dichroic filter units, wherein the second dichroic filter array and the third dichroic filter units together form a third dichroic filter array; and
    removing the second hard mask layer on the second dichroic filter array after the second patterned photoresist layer is removed.

11. The method of manufacturing a dichroic filter array as claimed in claim 10, Wherein the material of the first hardmask layer includes silicon nitride, silicon oxide, or silicon oxynitride.

12. The method of manufacturing a dichroic filter array as claimed in claim 10, wherein the material of the second hardmask layer includes silicon nitride, silicon oxide, or silicon oxynitride.

13. The method of manufacturing a dichroic filter array as claimed in claim 10, wherein the substrate is selected from a group consisting of a transparent substrate and a silicon substrate.

14. The method of manufacturing a dichroic filter array as claimed in claim 13, wherein the silicon substrate comprises a controlling element, for controlling the third dichroic filter array.

15. The method of manufacturing a dichroic filter array as claimed in claim 10, wherein the method of removing the first patterned photoresist layer and the second dichroic filter material layer located on the first patterned photoresist layer includes a lift-off process.

16. The method of manufacturing a dichroic filter array as claimed in claim 10, wherein the method of removing the second patterned photoresist layer and the third dichroic filter material layer located on the second patterned photoresist layer includes a lift-off process.

17. The method of manufacturing a dichroic filter array as claimed in claim 10, wherein the method of removing the exposed portion of the first dichroic filter material layer includes a dry etching process with the first patterned photoresist layer as a mask.

18. The method of manufacturing a dichroic filter array as claimed in claim 10, wherein the method of removing the exposed portion of the first dichroic filter array includes a dry etching process with the second patterned photoresist layer as a mask.

19. The method of manufacturing a dichroic filter array as claimed in claim 10, wherein the first dichroic filter material layer, the second dichroic filter material layer, and the third dichroic filter material layer include an alternatively stacked titanium oxide thin layers and silicon oxide thin layers.

20. The method of manufacturing a dichroic filter array as claimed in claim 10, wherein the method of manufacturing the first dichroic filter material layer, the second dichroic filter material layer, and the third dichroic filter material layer includes evaporation, sputtering, or CVD.

21. The method of manufacturing a dichroic filter array as claimed in claim 10, wherein the filtered wave bands of the first dichroic filter units, the second dichroic filter units, and the third dichroic filter units are different.

* * * * *